United States Patent
Kwon et al.

(10) Patent No.: US 12,173,158 B2
(45) Date of Patent: *Dec. 24, 2024

(54) CARBOXYLIC ACID MODIFIED-NITRILE BASED COPOLYMER LATEX

(71) Applicant: LG Chem, Ltd., Seoul (KR)

(72) Inventors: Won Sang Kwon, Daejeon (KR); Jung Eun Kim, Daejeon (KR); Jung Su Han, Daejeon (KR); Seung Uk Yeu, Daejeon (KR)

(73) Assignee: LG Chem, Ltd., Seoul (KR)

( * ) Notice: Subject to any disclaimer, the term of this patent is extended or adjusted under 35 U.S.C. 154(b) by 624 days.

This patent is subject to a terminal disclaimer.

(21) Appl. No.: 17/439,979

(22) PCT Filed: Feb. 8, 2021

(86) PCT No.: PCT/KR2021/001631
§ 371 (c)(1),
(2) Date: Sep. 16, 2021

(87) PCT Pub. No.: WO2021/201419
PCT Pub. Date: Oct. 7, 2021

(65) Prior Publication Data
US 2022/0251346 A1    Aug. 11, 2022

(30) Foreign Application Priority Data

Mar. 31, 2020 (KR) .................. 10-2020-0039060
Mar. 31, 2020 (KR) .................. 10-2020-0039065
(Continued)

(51) Int. Cl.
*C08L 9/04* (2006.01)
*B29C 41/14* (2006.01)
(Continued)

(52) U.S. Cl.
CPC .............. *C08L 9/04* (2013.01); *B29C 41/14* (2013.01); *C08F 2/26* (2013.01); *C08F 220/06* (2013.01);
(Continued)

(58) Field of Classification Search
CPC . C08L 9/04; C08F 220/06; C08F 2/26; B29K 2105/0064; B29C 41/14
See application file for complete search history.

(56) References Cited

U.S. PATENT DOCUMENTS 6,380,303 B1   4/2002  Ogoe et al.
2005/0171272 A1   8/2005  Ota et al.
(Continued)

FOREIGN PATENT DOCUMENTS

CN    1656166 A    8/2005
CN    1696164 A    11/2005
(Continued)

OTHER PUBLICATIONS

Translation of JP 2007-177091, Jul. 12, 2007. (Year: 2007).*
(Continued)

*Primary Examiner* — Satya B Sastri
(74) *Attorney, Agent, or Firm* — Lerner David LLP

(57) ABSTRACT

A carboxylic acid-modified nitrile-based copolymer latex includes a carboxylic acid-modified nitrile-based copolymer including: 65.5 wt % to 82.5 wt % of a conjugated diene-based monomer-derived unit, 15 wt % to 30 wt % of an ethylenic unsaturated nitrile-based monomer-derived unit, and 2.5 wt % to 4.5 wt % of an ethylenic unsaturated acid monomer-derived unit, wherein the carboxylic acid-modified nitrile-based copolymer latex satisfies General Formula 1:

$1.0 \text{ mm}^2/\text{s} \leq CV_0 \leq 3.0 \text{ mm}^2/\text{s}$    [General Formula 1]

(Continued)

wherein $CV_0$ represents a capillary viscosity of the carboxylic acid-modified nitrile-based copolymer latex which is measured in a swollen state in a methyl ethyl ketone solvent.

10 Claims, 2 Drawing Sheets

(30) Foreign Application Priority Data

| | | | |
|---|---|---|---|
| Mar. 31, 2020 | (KR) | ..................... | 10-2020-0039067 |
| Mar. 31, 2020 | (KR) | ..................... | 10-2020-0039071 |
| Mar. 31, 2020 | (KR) | ..................... | 10-2020-0039074 |
| Mar. 31, 2020 | (KR) | ..................... | 10-2020-0039076 |
| Dec. 11, 2020 | (KR) | ..................... | 10-2020-0173039 |

(51) Int. Cl.
| | |
|---|---|
| B29K 105/00 | (2006.01) |
| B29L 31/48 | (2006.01) |
| C08F 2/26 | (2006.01) |
| C08F 220/06 | (2006.01) |

(52) U.S. Cl.
CPC ................ *B29K 2105/0064* (2013.01); *B29L 2031/4864* (2013.01)

(56) References Cited

U.S. PATENT DOCUMENTS

| | | | |
|---|---|---|---|
| 2006/0148992 A1 | 7/2006 | Kim et al. | |
| 2011/0213073 A1 | 9/2011 | Weitzel et al. | |
| 2016/0244575 A1 | 8/2016 | Kim et al. | |
| 2016/0289396 A1 | 10/2016 | Patel et al. | |
| 2017/0283599 A1 | 10/2017 | Cha et al. | |
| 2017/0327669 A1 | 11/2017 | Ng et al. | |
| 2018/0362750 A1 | 12/2018 | Lee et al. | |
| 2019/0071530 A1* | 3/2019 | Igari ................. | C08F 236/14 |
| 2019/0127507 A1 | 5/2019 | Joe et al. | |
| 2019/0161601 A1 | 5/2019 | Enomoto et al. | |
| 2020/0040118 A1 | 2/2020 | Kim et al. | |
| 2020/0062879 A1 | 2/2020 | Simpson et al. | |
| 2020/0317893 A1 | 10/2020 | Kim et al. | |
| 2022/0185999 A1 | 6/2022 | Oh et al. | |
| 2022/0195151 A1 | 6/2022 | Han et al. | |
| 2022/0204732 A1 | 6/2022 | Ha et al. | |
| 2022/0227900 A1 | 7/2022 | Kim et al. | |
| 2022/0227910 A1 | 7/2022 | Lee et al. | |

FOREIGN PATENT DOCUMENTS

| | | | |
|---|---|---|---|
| CN | 101747542 A | 6/2010 | |
| CN | 107636032 A | 1/2018 | |
| CN | 108368189 A | 8/2018 | |
| CN | 108779217 A | 11/2018 | |
| CN | 110072936 A | 7/2019 | |
| CN | 110198964 A | 9/2019 | |
| EP | 0277687 A2 | 8/1988 | |
| EP | 1215236 A2 | 6/2002 | |
| EP | 1478672 A1 | 11/2004 | |
| EP | 1148068 B1 | 5/2006 | |
| EP | 2891668 A1 | 7/2015 | |
| EP | 3412717 A1 | 12/2018 | |
| EP | 3412718 A1 | 12/2018 | |
| EP | 3421532 A1 | 1/2019 | |
| EP | 3438145 A1 | 2/2019 | |
| EP | 3486280 A1 | 5/2019 | |
| EP | 3556785 A1 | 10/2019 | |
| JP | H08319303 A | 12/1996 | |
| JP | H1112328 A | 1/1999 | |
| JP | H1192595 A | 4/1999 | |
| JP | 2003-165814 A | 6/2003 | |
| JP | 2003165870 A | 6/2003 | |
| JP | 2003252935 A | 9/2003 | |
| JP | 2003277523 A | 10/2003 | |
| JP | 2003342303 A | 12/2003 | |
| JP | 2005-336273 A | 12/2005 | |
| JP | 2007031574 A | 2/2007 | |
| JP | 3915489 B2 | 5/2007 | |
| JP | 2007161925 A | 6/2007 | |
| JP | 2007177091 A * | 7/2007 | |
| JP | 4100740 B2 | 6/2008 | |
| JP | 2014-088536 A | 5/2014 | |
| JP | 5487541 B2 | 5/2014 | |
| JP | 201488536 A | 5/2014 | |
| JP | 5719388 B2 | 5/2015 | |
| JP | 2016538393 A | 12/2016 | |
| JP | 2017149949 A | 8/2017 | |
| JP | 2019529602 A | 10/2019 | |
| JP | 2020505492 A | 2/2020 | |
| JP | 2022530161 A | 6/2022 | |
| JP | 2022530214 A | 6/2022 | |
| JP | 2022530306 A | 6/2022 | |
| JP | 2022530507 A | 6/2022 | |
| JP | 2022531537 A | 7/2022 | |
| KR | 960000567 B1 | 1/1996 | |
| KR | 20040105464 A | 12/2004 | |
| KR | 100680328 B1 | 2/2007 | |
| KR | 20100033125 A | 3/2010 | |
| KR | 101123928 B1 | 3/2012 | |
| KR | 20120087480 A | 8/2012 | |
| KR | 20150058001 A | 5/2015 | |
| KR | 20170047880 A | 5/2017 | |
| KR | 20170061464 A * | 6/2017 | |
| KR | 20170110956 A | 10/2017 | |
| KR | 101811343 B1 | 12/2017 | |
| KR | 20180028606 A | 3/2018 | |
| KR | 20180051147 A | 5/2018 | |
| KR | 20190060692 A | 6/2019 | |
| WO | 2017-170267 A1 | 10/2017 | |
| WO | 2018-117109 A1 | 6/2018 | |
| WO | 2019172539 A1 | 9/2019 | |

OTHER PUBLICATIONS

KR 20170061464 A, Jun. 2017, machine translation (Year: 2017).*
Search report from International Application No. PCT/KR2021/001631, mailed May 17, 2021.
Search report from International Application No. PCT/KR2021/001627, mailed May 26, 2021.
Search report from International Application No. PCT/KR2021/001621, mailed May 17, 2021.
Dortmund Data Bank. "Vapor pressure of 1,3-Butadiene", Retrieved from the Internet: <www.ddbst.com/en/EED/PCPNAP_C364.php>, (Jan. 2023). 2 pgs.
Search Report dated Nov. 16, 2023 from the Office Action for Chinese Application No. 202180002529.5 issued Nov. 22, 2023, 2 pages. [See p. 1, categorizing the cited reference].
Extended European Search Report for Application No. 21766097.6 dated Mar. 22, 2022, pp. 1-6.
Extended European Search Report for Application No. 21770106.9 dated Mar. 28, 2022, pp. 1-7.
Extended European Search Report for Application No. 21777192.2 dated Mar. 22, 2022, pp. 1-6.
Extended European Search Report for Application No. 21780843.5 dated Mar. 22, 2022, pp. 1-6.
Extended European Search Report for Application No. 21782025.7 dated Mar. 22, 2022, pp. 1-6.
Search report from International Application No. PCT/KR2021/001626, mailed May 27, 2021, 2 pages.
Search report from International Application No. PCT/KR2021/001629, mailed May 27, 2021, 2 pages.

* cited by examiner

[FIG. 1]
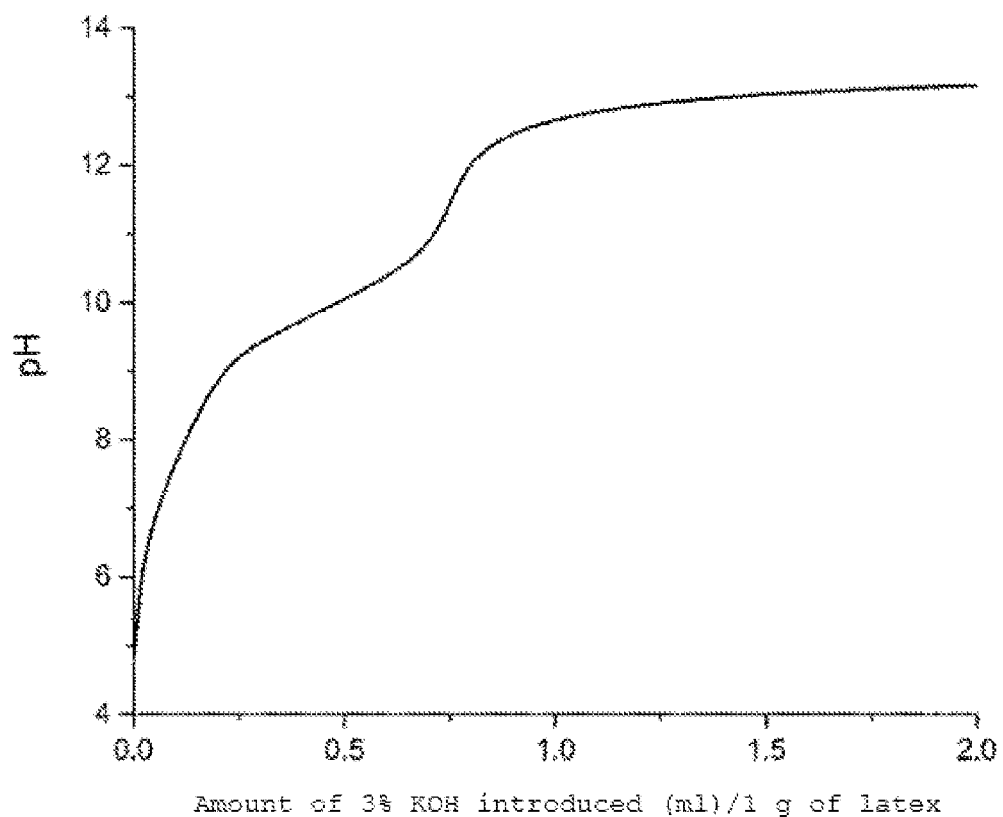

【FIG. 2】
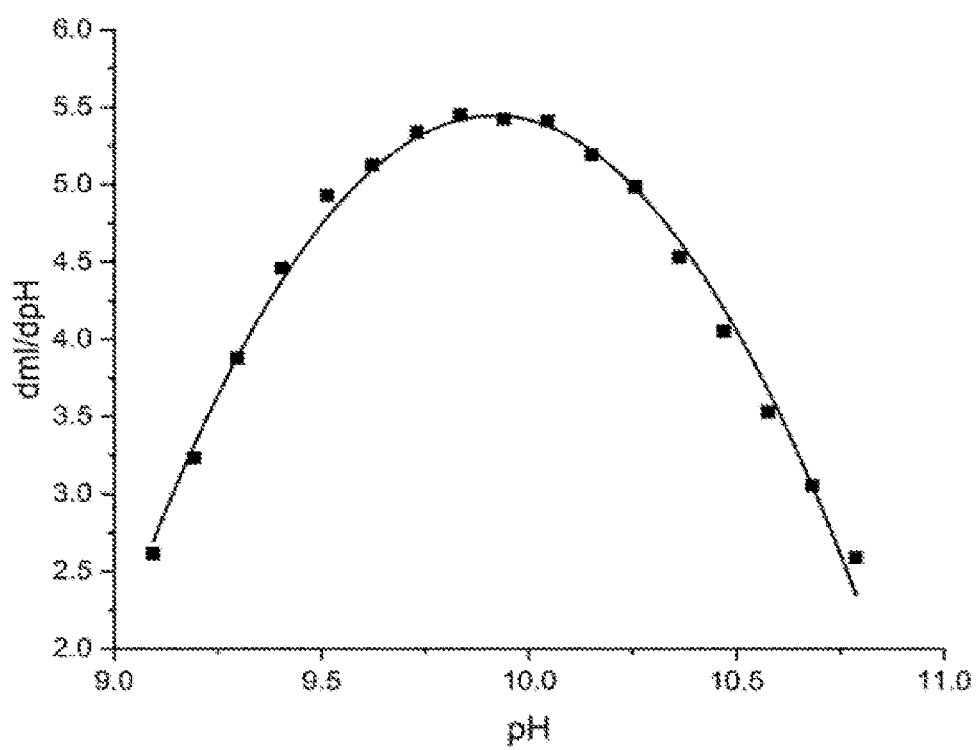

CARBOXYLIC ACID MODIFIED-NITRILE BASED COPOLYMER LATEX

TECHNICAL FIELD

Cross-Reference to Related Applications

The present application claims the benefit of priorities to Korean Patent Application No. 10-2020-0039060, filed on Mar. 31, 2020, Korean Patent Application No. 10-2020-0039067, filed on Mar. 31, 2020, Korean Patent Application No. 10-2020-0039076, filed on Mar. 31, 2020, Korean Patent Application No. 10-2020-0039074, filed on Mar. 31, 2020, Korean Patent Application No. 10-2020-0039065, filed on Mar. 31, 2020, Korean Patent Application No. 10-2020-0039071, filed on Mar. 31, 2020, and Korean Patent Application No. 10-2020-0173039, filed on Dec. 11, 2020, the entire contents of which are incorporated herein as a part of the specification.

TECHNICAL FIELD

The present invention relates to a carboxylic acid-modified nitrile-based copolymer latex which allows manufacture of a dip-molded article having a high elongation and softness.

BACKGROUND ART

Usage of disposable rubber gloves is increasing in various fields such as housework, the food industry, the electronics industry, and the medical field. In the past, a natural rubber latex was dip-molded to manufacture disposable gloves, but some users had a problem with protein allergies such as pain or a rash. Due to the problem, recently, for replacing a natural rubber, disposable gloves made by dip molding a nitrile-based latex having a high tensile strength, excellent chemical resistance, and no allergy risk are in the limelight.

However, since the nitrile-based rubber gloves using a nitrile-based latex have lower elongation and softness than natural rubber gloves, the nitrile-based rubber gloves still do not replace the natural rubber gloves in uses such as surgical gloves for which it is important to have an excellent fit and to maintain close adhesion even during long wearing.

Accordingly, various studies for improving elongation and softness of gloves have been conducted. However, conventionally, a study for changing a crosslinking agent, such as changing ratios of zinc oxide, sulfur, and a vulcanization accelerator which are introduced with a latex during glove manufacture or introducing a new crosslinking agent, has been mainly conducted rather than a study for a latex required for manufacturing gloves having a high elongation and an excellent fit. However, when elongation and softness are improved only by changes in the crosslinking agents, other physical properties of gloves, such as tensile strength or durability are deteriorated. In addition, when an excessive amount of sulfur or a vulcanization accelerator is used, discoloration of gloves or a type IV allergy problem may occur.

Therefore, development of a latex itself for improving elongation and softness of nitrile-based gloves is currently in demand.

DISCLOSURE

Technical Problem

An object of the present invention is to provide a carboxylic acid-modified nitrile-based copolymer latex for improving elongation and softness of nitrile-based rubber gloves, in order to solve the problems mentioned in the Background Art.

That is, an object of the present invention is to control a monomer content in a carboxylic acid-modified nitrile-based copolymer latex and adjust a capillary viscosity ($CV_0$) of the carboxylic acid-modified nitrile-based copolymer latex which is measured in a swollen state in a methyl ethyl ketone solvent to a range of 1.0 mm²/s to 3.0 mm²/s, thereby improving elongation and softness of nitrile-based rubber gloves molded from a latex composition for dip molding including the carboxylic acid-modified nitrile-based copolymer latex.

Technical Solution

In one general aspect, a carboxylic acid-modified nitrile-based copolymer latex includes a carboxylic acid-modified nitrile-based copolymer including: 65.5 wt % to 82.5 wt % of a conjugated diene-based monomer-derived unit, 15 wt % to 30 wt % of an ethylenic unsaturated nitrile-based monomer-derived unit, and 2.5 wt % to 4.5 wt % of an ethylenic unsaturated acid monomer-derived unit, wherein the carboxylic acid-modified nitrile-based copolymer latex satisfies the following General Formula 1:

$$1.0 \text{ mm}^2/\text{s} \leq CV_0 \leq 3.0 \text{ mm}^2/\text{s} \quad \text{[General Formula 1]}$$

wherein $CV_0$ represents a capillary viscosity of the carboxylic acid-modified nitrile-based copolymer latex which is measured in a swollen state in a methyl ethyl ketone solvent.

Advantageous Effects

According to the carboxylic acid-modified nitrile-based copolymer latex according to the present invention, the content of a monomer in the carboxylic acid-modified nitrile-based copolymer latex is controlled, and simultaneously, a capillary viscosity ($CV_0$) of the carboxylic acid-modified nitrile-based copolymer latex which is measured in a swollen state in a methyl ethyl ketone solvent is controlled to a range of 1.0 mm²/s to 3.0 mm²/s, thereby improving elongation and softness of a molded article manufactured therefrom.

DESCRIPTION OF DRAWINGS

FIG. 1 is a graph showing a pH change depending on an amount of KOH introduced.

FIG. 2 is a differential curve of an amount of KOH introduced depending on a pH.

BEST MODE

The terms and words used in the description and claims of the present invention are not to be construed limitedly as having general or dictionary meanings but are to be construed as having meanings and concepts meeting the technical ideas of the present invention, based on a principle that the inventors are able to appropriately define the concepts of terms in order to describe their own inventions in the best mode.

The term "a monomer-derived unit" in the present invention may refer to a component, a structure, or a material itself derived from a monomer, and as a specific example, may refer to a unit formed in the polymer by the introduced monomer participating in the polymerization reaction during polymerization.

The term "latex" in the present invention may refer to a polymer or copolymer polymerized by polymerization being present in a form dispersed in water, and as a specific example, may refer to fine particles of a polymer in a rubber phase or a copolymer in a rubber phase polymerized by emulsion polymerization being present in a form dispersed in water in a colloid state.

The term "derived layer" in the present invention may represent a layer formed from a polymer or a copolymer, and as a specific example, a layer formed from a polymer or a copolymer by attaching, fixing, and/or polymerizing the polymer or the copolymer on a dip mold during manufacture of molded article by dip molding.

The term "crosslinking agent-derived crosslinking part" in the present invention may refer to a component, a structure, or a material itself caused by a compound, or a crosslinking part serving as a crosslinker in a polymer or between polymers, formed by the action or reaction of the crosslinking agent composition.

The term "alkyl" in the present invention may refer to a linear or branched saturated monovalent hydrocarbon of carbon atoms, such as, methyl, ethyl, propyl, 2-propyl, n-butyl, iso-butyl, tert-butyl, pentyl, hexyl, and dodecyl, or may include alkyl substituted by a substituent as well as unsubstituted alkyl.

The term "aryl" in the present invention may refer to an alkyl group as defined above in which one or more hydrogen atoms are substituted by an aryl group, such as phenyl, naphthalenyl, and fluorenyl, or may include aryl substituted by a substituent as well as unsubstituted aryl.

The term "(meth)acrylate" in the present invention may refer to both acrylate and methacrylate.

Hereinafter, the present invention will be described in more detail for better understanding of the present invention.

According to the present invention, there is provided a carboxylic acid-modified nitrile-based copolymer latex which may improve elongation and softness of a molded article manufactured from the carboxylic acid-modified nitrile-based copolymer latex. The carboxylic acid-modified nitrile-based copolymer in the carboxylic acid-modified nitrile-based copolymer latex may include a conjugated diene-based monomer-derived unit, an ethylenic unsaturated nitrile-based monomer-derived unit, and an ethylenic unsaturated acid monomer-derived unit.

The conjugated diene-based monomer forming the conjugated diene-based monomer-derived unit may be one or more selected from the group consisting of 1,3-butadiene, 2,3-dimethyl-1,3-butadiene, 2-ethyl-1,3-butadiene, 1,3-pentadiene, and isoprene. As a specific example, the conjugated diene-based monomer may be 1,3-butadiene or isoprene.

The content of the conjugated diene-based monomer-derived unit may be 64.5 wt % to 83.5 wt %, 65.5 wt % to 82.4 wt %, or 67.5 wt % to 79.5 wt %, based on the total content of the carboxylic acid-modified nitrile-based copolymer, and within the range, a molded article molded from a latex composition for dip molding including the carboxylic acid-modified nitrile-based copolymer is flexible and stretches well, and is soft to feel good to the touch and have excellent fit.

The ethylenic unsaturated nitrile-based monomer forming the ethylenic unsaturated nitrile-based monomer-derived unit may be one or more selected from the group consisting of acrylonitrile, methacrylonitrile, fumaronitrile, α-chloronitrile, and α-cyanoethyl acrylonitrile. As a specific example, the ethylenic unsaturated nitrile-based monomer may be acrylonitrile or methacrylonitrile, and as a more specific example, may be acrylonitrile.

The content of the ethylenic unsaturated nitrile-based monomer-derived unit may be 15 wt % to 30 wt % or 18 wt % to 28 wt %, based on a total content of the carboxylic acid-modified nitrile-based copolymer, and within the range, an article molded from a latex composition for dip molding including the carboxylic acid-modified nitrile-based copolymer is soft and stretches well, and feels good to the touch and has excellent fit.

The ethylenic unsaturated acid monomer forming the ethylenic unsaturated acid monomer-derived unit may be an ethylenic unsaturated monomer containing an acidic group such as a carboxyl group, a sulfonic acid group, and an acid anhydride group. As a specific example, the ethylenic unsaturated acid monomer may include one or more selected from the group consisting of ethylenic unsaturated monomers such as an acrylic acid, a methacrylic acid, an itaconic acid, a maleic acid, and a fumaric acid; polycarboxylic anhydrides such as an hydrous maleic acid and an anhydrous citraconic acid; ethylenic unsaturated sulfonic acid monomers such as a styrene sulfonic acid; and ethylenic unsaturated polycarboxylic acid partial ester monomers such as monobutyl fumarate, monobutyl maleate, and mono-2-hydroxypropyl maleate. As a more specific example, the ethylenic unsaturated acid monomer may be one or more selected from the group consisting of an acrylic acid, a methacrylic acid, an itaconic acid, a maleic acid, and a fumaric acid, and as a more specific example, may be a methacrylic acid. The ethylenic unsaturated acid monomer may be also used in the form of a salt such as an alkali metal salt or an ammonium salt during polymerization.

The content of the ethylenic unsaturated acid monomer-derived unit may be 1.5 wt % to 5.5 wt % or 2.5 wt % to 4.5 wt %, based on the total content of the carboxylic acid-modified nitrile-based copolymer, and within the range, a molded article molded from a latex composition for dip molding including the carboxylic acid-modified nitrile-based copolymer is soft and stretches well, and feels good to the touch and has excellent fit.

The carboxylic acid-modified nitrile-based copolymer latex of the present invention may optionally further include an ethylenic unsaturated monomer-derived unit in addition to the conjugated diene-based monomer-derived unit, the ethylenic unsaturated nitrile-based monomer-derived unit, and the ethylenic unsaturated acid monomer-derived unit.

The ethylenic unsaturated monomer forming the ethylenic unsaturated monomer-derived unit may include one or more selected from the group consisting of hydroxyalkyl (meth)acrylate monomers having 1 to 4 carbon atoms; vinyl aromatic monomers selected from the group consisting of styrene, arylstyrene, and vinyl naphthalene; fluoroalkylvinyl ether such as fluoroethylvinyl ether; ethylenic unsaturated amide monomers selected from the group consisting of (meth)acrylamide, N-methylol (meth)acrylamide, N,N-dimethylol (meth)acrylamide, N-methoxymethyl (meth)acrylamide, and N-propoxymethyl (meth)acrylamide; nonconjugated diene monomers such as vinyl pyridine, vinyl norbornene, dichclopentadiene, 1,4-hexadiene; and ethylenic unsaturated carboxylic acid ester monomers selected from the group consisting of methyl (meth)acrylate, ethyl (meth)acrylate, butyl (meth)acrylate, 2-ethylhexyl (meth)acrylate, trifluoroethyl (meth)acrylate, tetrafluoropropyl (meth)acrylate, dibutyl maleate, dibutyl fumarate, diethyl maleate, methoxymethyl (meth)acrylate, ethoxyethyl (meth)acrylate, methoxyethoxyethyl (meth)acrylate, cyanomethyl (meth)acrylate, 2-cyanoethyl (meth)acrylate, 1-cyanopropyl (meth)acrylate, 2-ethyl-6-cyanohexyl (meth) acrylate, 3-cyanopropyl (meth) acrylate, hydroxyethyl (meth) acrylate, hydroxypropyl (meth) acrylate, glycidyl (meth)acrylate, and dimethylaminoethyl (meth)acrylate.

When the carboxylic acid-modified nitrile-based copolymer optionally includes the ethylenic unsaturated monomer-derived unit, the content of the ethylenic unsaturated monomer-derived unit may be 0.5 wt % to 5 wt %, based on the total content of the carboxylic acid-modified nitrile-based copolymer, and within the range, the characteristics such as tensile strength of the molded article molded from the latex composition for dip molding including the carboxylic acid-modified nitrile-based copolymer may be improved.

The characteristics of the monomer composition of the carboxylic acid-modified nitrile-based copolymer latex improve the elongation and the softness of the molded article made of the carboxylic acid-modified nitrile-based copolymer latex, due to the optimization of the content of the ethylenic unsaturated nitrile-based monomer or the ethylenic unsaturated acid monomer.

The carboxylic acid-modified nitrile-based copolymer latex in the present invention may impart the unprecedented characteristic of the latex by controlling process factors of the preparation method described later as well as the monomer composition.

Specifically, first, a method of preparing the carboxylic acid-modified nitrile-based copolymer latex has a polymerization process of introducing a conjugated diene-based monomer, an ethylenic unsaturated nitrile-based monomer, and an ethylenic unsaturated acid monomer to a polymerization reactor and performing polymerization.

The polymerization process is for forming a main chain of the carboxylic acid-modified nitrile-based copolymer latex, and the polymerization is emulsion polymerization. The monomer herein is introduced to the polymerization reactor as the kind and at the content of monomers described above before the polymerization reaction. Each monomer may be introduced portionwise, batchwise, or continuously. For example, when introduced batchwise, the conjugated diene-based monomer, the ethylenic unsaturated nitrile-based monomer, and the ethylenic unsaturated acid monomer may be introduced to the polymerization reactor at the same time. In addition, when introduced portionwise, for example, a part of the monomers are introduced first to the polymerization reactor, and the remaining monomers are introduced second to the polymerization reactor. As a specific example, the ethylenic unsaturated nitrile-based monomer and the ethylenic unsaturated acid monomer may be introduced in the first introduction and the conjugated diene-based monomer may be introduced in the second introduction.

In addition, when the monomers are introduced before the polymerization reaction, an additive such as an emulsifier and a chain transfer agent and a medium may be introduced batchwise or portionwise after introducing the monomers and stirring. For example, when the monomers are introduced batchwise before the polymerization reaction, the additive and the medium may be introduced after introducing the monomers, and when the monomers are introduced portionwise before the polymerization reaction, the additive and the medium may be introduced between the first introduction and the second introduction of the monomers. When the monomers are first introduced and stirring is performed before introducing the additive and the medium, the composition and the amount of the monomers dissolved in a water phase at the beginning of the polymerization reaction are influenced, and the molecular weight of the carboxylic acid-modified nitrile-based copolymer to be polymerized or the acid distribution of the copolymer in the latex particles may be influenced by the effect.

In a subsequent polymerization process, the polymerization reaction is initiated by introducing a polymerization initiator, and the conjugated diene-based monomer, the ethylenic unsaturated nitrile-based monomer, and the ethylenic unsaturated acid monomer may be divided and introduced first, second, and third during the polymerization reaction, that is, introduced in n portions depending on the kind of monomers.

As such, in the case in which the monomers are introduced portionwise by adjusting the introduction timing of the monomers during the polymerization reaction, when a monomer-derived unit which is derived from each monomer in the carboxylic acid-modified nitrile-based copolymer is formed, a distribution of each monomer depending on a reaction rate difference for each monomer may be made uniform, and thus, a balance between the physical properties of the molded article manufactured using the carboxylic acid-modified nitrile-based copolymer may be improved.

In addition, when the monomers are introduced portionwise during the polymerization reaction, the additive such as an emulsifier and a chain transfer agent and the medium may be introduced portionwise accordingly. In this case, it is easy to control the distribution of the monomers by a reaction rate difference of each monomer, and a balance between the physical properties of the molded article made of the carboxylic acid-modified nitrile-based copolymer is improved.

The emulsifier may be one or more selected from the group consisting of anionic surfactants, non-ionic surfactants, cationic surfactants, and amphoteric surfactants, and as a specific example, may be one or more anionic surfactants selected from the group consisting of alkylbenzene sulfonates, aliphatic sulfonates, higher alcohol sulfuric acid ester salts, α-olefin sulfonates, and alkylether sulfuric acid esters. In addition, the emulsifier is introduced at 2 parts by weight to 4 parts by weight, based on 100 parts by weight of the total content of the monomers introduced, and generally, when the amount of the emulsifier is large, the particle diameter of the carboxylic acid-modified nitrile-based copolymer is smaller and the stability is improved, but it is difficult to remove the emulsifier in the manufacturing process of the molded article and an amount of air bubbles generated is increased to make the manufacture difficult.

The chain transfer agent may include one or more selected from the group consisting of α-methylstyrene dimers; mercaptans such as t-dodecylmercaptan, n-dodecylmercaptan, and octylmercaptan; halogenated hydrocarbons such as carbon tetrachloride, methylene chloride, and methylene bromide; and sulfur-containing compounds such as tetrethylthiuram disulfide, dipentamethylenethiuram disulfide, and diisopropylxanthogen disulfide. The specific example thereof may be mercaptans. The amount of the chain transfer agent introduced may be 0.2 parts by weight to 0.9 parts by weight, based on 100 parts by weight of the total content of the monomer introduced in the polymerization process. Within the range, the physical properties of the molded article are excellent.

The medium may be water, as a specific example, deionized water. The temperature of water used as the medium in the polymerization of the carboxylic acid-modified nitrile-based copolymer may be 45° C. to 80° C. Generally, water at room temperature is used as polymerization water in emulsion polymerization, but when water at a high temperature is used as polymerization water, the composition and the amount of monomers dissolved in a water phase and the amounts of the emulsifier and the chain transfer agent are influenced, and the acid distribution of the copolymer in the carboxylic acid-modified nitrile-based copolymer latex particles to be polymerized and an entanglement degree of the copolymer are influenced. In addition, the medium may be introduced at 105 parts by weight to 140 parts by weight, based on 100 parts by weight of the total content of the monomer introduced in the polymerization process.

The polymerization of the carboxylic acid-modified nitrile-based copolymer may be performed by further including an additive such as a chelating agent, a dispersing agent, a pH adjusting agent, a deoxidizer, a particle diameter adjusting agent, an anti-aging agent, and an oxygen scavenger.

The polymerization reaction may be initiated by introducing a polymerization initiator.

As the initiator, a radical initiator may be used, and the radical initiator may be one or more selected from the group consisting of inorganic peroxides such as sodium persulfate, potassium persulfate, ammonium persulfate, potassium perphosphate, and hydrogen peroxide; organic peroxides such as diisopropylbenzene hydroperoxide, t-butyl hydroperoxide, cumene hydroperoxide, p-menthane hydroperoxide, di-t-butyl peroxide, t-butylcumyl peroxide, acetyl peroxide, isobutyl peroxide, octanoyl peroxide, benzoyl peroxide, 3,5,5-trimethylhexanol peroxide, and t-butylperoxy isobutylate; and nitrogen compounds such as azobis isobutyronitrile, azobis-2,4-dimethylvaleronitrile, azobiscyclohexane carbonitrile, and azobis methyl isobutyric acid (butyl acid). As a specific example, the polymerization initiator may be an inorganic peroxide, and more specifically, a persulfate initiator. In addition, the polymerization initiator may be introduced at 0.1 parts by weight to 0.5 parts by weight, based on 100 parts by weight of the total content of the monomers, and within the range, the polymerization rate may be maintained at an appropriate level.

Here, when the organic peroxide or the inorganic peroxide is used as the polymerization initiator, it may be used in combination with an activator. The activator may be compounds containing a metal ion in a reduced state such as ferrous sulfate or cuprous naphthenate; sulfonic acid compounds such as sodium methanesulfonate; or amine compounds such as dimethylaniline alone or in combination of two or more. Specifically, the activator may be one or more selected from the group consisting of sodium formaldehyde sulfoxylate, sodium ethylenediamine tetraacetate, ferrous sulfate, dextrose, sodium pyrophosphate, and sodium sulfite. The amount of the activator introduced may be 0.05 parts by weight to 1 part by weight, based on 100 parts by weight of the total content of the monomer, and within the range, the polymerization rate may be maintained at an appropriate level.

The polymerization of the carboxylic acid-modified nitrile-based copolymer is performed at a temperature of 5° C. to 60° C., and within the range, the polymerization rate may be maintained at an appropriate level.

In addition, the polymerization of the carboxylic acid-modified nitrile-based copolymer may be performed by adjusting a reaction pressure change relative to an initial reaction pressure depending on a polymerization conversion rate to a specific range. Specifically, a reaction pressure range at the beginning of the polymerization may be 2.0 kgf/cm$^2$ to 2.8 kgf/cm$^2$, a reaction pressure at a polymerization conversion rate from 1% to 45% is controlled to a pressure increase in a range of 15% or less relative to a reaction pressure at the beginning of the polymerization, and in particular, a reaction pressure when the polymerization conversion rate is 40% may be a pressure increase in a range of 5% to 10% relative to a reaction pressure at the beginning of the polymerization.

A reaction pressure at the polymerization conversion rate of 46% to 75% is controlled to a pressure increase in a range of 5% to 70% relative to the reaction pressure at the beginning of the polymerization, and in particular, a reaction pressure when the polymerization conversion rate is 60% may be a pressure increase in a range of 30% to 65% relative to the reaction pressure at the beginning of the polymerization.

A reaction pressure between the polymerization conversion rate of 76% and polymerization completion is controlled to a pressure increase in a range of 0% to 5% relative to the reaction pressure at the beginning of the polymerization or a pressure decrease in a range of 0 to 100% relative to the reaction pressure at the beginning of the polymerization, and in particular, a reaction pressure when the polymerization conversion rate is 90% may be adjusted to a pressure decrease in a range of 10% or more relative to the reaction pressure at the beginning of the polymerization.

In the polymerization reaction of the carboxylic acid-modified nitrile-based copolymer, the polymerization conversion rate may be measured by a method commonly known in the art. For example, a specific amount of sample is collected from a reaction composition at regular time intervals, a solid content is measured, and the polymerization conversion rate is calculated by the following Equation 1:

Polymerization conversion rate (%)=[{(parts by weight of monomer and additive introduced) *solid content (%)−(parts by weight of additive introduced other than monomer)}/(total parts by weight of monomer introduced)]*100   [Equation 1]

wherein parts by weight is based on 100 parts by weight of the total content of the monomer introduced. A section polymerization conversion rate may be calculated by reflecting the parts by weight of the monomers and the parts by weight of the additive introduced so far to the corresponding section.

When the reaction pressure change relative to the initial reaction pressure depending on the polymerization conversion rate is adjusted to the above range, the composition and the amount of the monomers dissolved in a water phase are influenced in the polymerization reaction process, and the entanglement degree and the branch degree of the carboxylic acid-modified nitrile-based copolymer may be influenced by the effect.

The method of preparing a carboxylic acid-modified nitrile-based copolymer latex includes completing the polymerization reaction and obtaining the carboxylic acid-modified nitrile-based copolymer latex. Completion of the polymerization reaction is performed by cooling a polymerization system at a polymerization conversion rate of 85% or more or adding a polymerization terminator, a pH adjusting agent, or an antioxidant.

In addition, the method of preparing a carboxylic acid-modified nitrile-based copolymer latex may include removing an unreacted monomer by a deodorization process after completing the reaction.

In the present invention, in order to allow the physical properties of the molded article manufactured by a dip molding process using the carboxylic acid-modified nitrile-based copolymer latex to have softness and an excellent elongation, the amounts of the ethylenic nitrile-based monomer and the ethylenic unsaturated acid monomer are optimized in the composition of the monomers in the latex, and the entanglement degree, the branch degree, or the molecular weight of the carboxylic acid-modified nitrile-based copolymer, the acid distribution of the copolymer in the latex particles, and the like are adjusted in the polymerization process to optimize the structure of the latex particles.

The carboxylic acid-modified nitrile-based copolymer may be produced by the composition of the copolymer and the polymerization method described above. In the present invention, numerical value ranges of the parameters satisfying the physical properties required by the inventors while adjusting the physical properties of the carboxylic acid-modified nitrile-based copolymer were established, using various parameters shown in the following.

According to an exemplary embodiment of the present invention, the carboxylic acid-modified nitrile-based copolymer latex may satisfy the following General Formula 1:

$$1.0 \text{ mm}^2/\text{s} \leq CV_0 \leq 3.0 \text{ mm}^2/\text{s} \qquad \text{[General Formula 1]}$$

wherein $CV_0$ is measured under a condition of pH 8.2 to 9.2 using a methyl ethyl ketone (MEK) solvent using a capillary viscometer of a Cannon-Fenske routine type (SI Analytics GmbH Type No. 520 13). Therefore, $CV_0$ represents a capillary viscosity measured in a state in which the carboxylic acid-modified nitrile-based copolymer latex is swollen in a methyl ethyl ketone solvent. Generally, the capillary viscosity is used as a means for measuring the molecular weight of an uncrosslinked polymer. However, in the present invention, $CV_0$ means a capillary viscosity measured in a state in which copolymer particles in the latex are swollen in a methyl ethyl ketone solvent, that is, in a swollen state, unlike the common capillary viscosity. Therefore, information for the factors influencing swelling by the methyl ethyl ketone solvent as well as the molecular weight of the copolymer in the carboxylic acid-modified nitrile-based copolymer latex may be obtained from $CV_0$, and of the information, in particular, the information for the acid distribution of the copolymer in the latex particles may be effectively obtained. $CV_0$ may be in a range of 0.5 to 4 or 1 to 3.

That is, the carboxylic acid-modified nitrile-based copolymer latex satisfying the range of $CV_0$ may have the molecular weight of the copolymer at an appropriate level and an optimal acid distribution of the copolymer in the latex particles.

In order to have the elongation and the softness of the molded article manufactured from the latex composition for dip molding required in the present invention, the carboxylic acid-modified nitrile-based copolymer should be soft and stretch well as much as possible, and for this, the molecular weight of the copolymer should be optimized. When the molecular weight of the copolymer is not optimized, the copolymer becomes hard and stiff or does not stretch well. In addition, in the preparation of the latex composition for dip molding, the ethylenic unsaturated acid monomer-derived unit in the carboxylic acid-modified nitrile-based copolymer latex may be ionically bonded to a metal ion introduced in a metal oxide, and a bonding degree to the metal ion may also have a large influence on the elongation and the softness of the molded article manufactured from the latex composition for dip molding. The bonding degree to the metal ion is significantly influenced by the structure of the latex particles such as the acid distribution of the copolymer in the latex particles, and thus, when the molded article is manufactured using the carboxylic acid-modified nitrile-based copolymer having the optimal acid distribution of the copolymer in the latex particles, the elongation and the softness of the molded article may be improved.

For this, since the carboxylic acid-modified nitrile-based copolymer latex satisfying the range of $CV_0$ of the present invention has an appropriate level of a copolymer molecular weight and an optimal acid distribution of the copolymer in the latex particles, when the latex is used as a latex composition for dip molding, a molded article having the physical properties of, in particular, a high elongation and excellent softness may be implemented.

According to an exemplary embodiment of the present invention, the carboxylic acid-modified nitrile-based copolymer latex may satisfy the following General Formula 2:

$$0.85 \leq P \leq 1.0, P = CV_D/CV_0 \qquad \text{[General Formula 2]}$$

wherein $CV_0$ represents a capillary viscosity of the carboxylic acid-modified nitrile-based copolymer latex which is measured in a swollen in a methyl ethyl ketone solvent as described in General Formula 1, and $CV_D$ represents a capillary viscosity of the carboxylic acid-modified nitrile-based copolymer latex in a deswollen state.

Specifically, a state in which the copolymer particles in the latex are swollen in a methyl ethyl ketone solvent may be defined as a swollen state, and a deswollen state means a state in which a portion of the copolymer particles in the latex swollen in the methyl ethyl ketone solvent is removed, and for example, a state in which a specific energy is applied to the copolymer particles in the latex in a swollen state to remove a portion dissolved in the methyl ethyl ketone solvent may be referred to as a deswollen state. $CV_D$ may be a capillary viscosity measured after the carboxylic acid-modified nitrile-based copolymer latex is dissolved in a methyl ethyl ketone solvent under a condition of a pH 8.2 to 9.2, and then an energy of 55 kcal to 65 kcal is applied for 40 minutes using an ultrasonicator (Bransonic® M Mechanical Bath 5800) to deswell the carboxylic acid-modified nitrile-based copolymer latex. Here, the capillary viscosity may be measured in the same manner as in $CV_0$ measurement using a capillary viscometer of a Connon-Fenske routine type (SI Analytics GmbH Type No. 520 13).

In addition, P may refer to ratios of $CV_0$ and $CV_D$. Specifically, P may refer to a ratio of $CV_D$ to $CV_0$, and more specifically, a ratio of the capillary viscosity of the carboxylic acid-modified nitrile-based copolymer latex measured in a deswollen state to the capillary viscosity of the carboxylic acid-modified nitrile-based copolymer latex measured in a swollen state in a methyl ethyl ketone solvent. P may be 0.85 to 1 or 0.9 to 1. Information on the latex particle structure such as an entanglement degree or a branch degree of the copolymer in the carboxylic acid-modified nitrile-based copolymer latex may be obtained from P. The carboxylic acid-modified nitrile-based copolymer latex satisfying P has a latex particle structure in which the copolymer has an appropriate degree of entanglement or it is difficult to disentangle the entangled copolymer, and the molded article using the latex of the present invention as the latex composition for dip molding may have improved elasticity, that is, a stress retention.

According to an exemplary embodiment of the present invention, the carboxylic acid-modified nitrile-based copolymer latex may satisfy the following General Formulas 3 and 4:

$$5 \leq M \leq 20, M = m_1 \times m_2 \qquad \text{[General Formula 3]}$$

$$9.2 \leq pKa \leq 10.5 \qquad \text{[General Formula 4]}$$

In General Formula 3, $m_1$ represents an insolubility of a dried film of the carboxylic acid-modified nitrile-based copolymer latex in a methyl ethyl ketone solvent, and $m_2$ represents a swelling index of the dried film of the carboxylic acid-modified nitrile-based copolymer latex in the methyl ethyl ketone solvent.

In addition, in General Formula 3, an M value is represented by a product of an insolubility of the dried film of the carboxylic acid-modified nitrile-based copolymer latex in a methyl ethyl ketone solvent and a swelling index of the dried film in a methyl ethyl ketone solvent, and this value may satisfy a range of 5.0 to 20 or to 15. The insolubility of the dried film of the carboxylic acid-modified nitrile-based copolymer latex in a methyl ethyl ketone solvent is an indicator representing a crosslinking degree of the carboxylic acid-modified nitrile-based copolymer included in the carboxylic acid-modified nitrile-based copolymer latex, and the swelling index of the dried film of the carboxylic acid-modified nitrile-based copolymer latex in a methyl ethyl ketone solvent is an indicator representing a swelling property of the carboxylic acid-modified nitrile-based copolymer included in the carboxylic acid-modified nitrile-based copolymer latex in a methyl ethyl ketone solvent. Therefore, information on the entanglement degree of the carboxylic acid-modified nitrile-based copolymer latex or the acid distribution of the copolymer in the latex particles may be obtained from M which is a product of the two indicators.

In General Formula 4, a pKa value is an indicator representing an ionization degree of the ethylenic unsaturated acid of the carboxylic acid-modified nitrile-based copolymer latex, and the information on the acid distribution of the copolymer in the latex particles may be obtained therefrom. The pKa value may be in a range of 9.2 to 10.5 or 9.5 to 10.2.

The carboxylic acid-modified nitrile-based copolymer latex satisfying the ranges of M and pKa has an appropriate level of entanglement degree of the copolymer and has the acid distribution of the copolymer in optimal latex particles. Therefore, when the latex is used in the latex composition for dip molding, occurrence of a flow mark may be prevented in the manufacturing process of a molded article to improve workability, and also polymerization stability may be improved in the polymerization of the carboxylic acid-modified nitrile-based copolymer latex.

As such, the latex is prepared while confirming the numerical ranges of $CV_0$, P, M, and pKa, thereby completing the latex of the present invention.

According to the present invention, a latex composition for dip molding including the carboxylic acid-modified nitrile-based copolymer latex is provided.

According to an exemplary embodiment of the present invention, the latex composition for dip molding may include the carboxylic acid-modified nitrile-based copolymer latex and a crosslinking agent composition. The crosslinking agent composition may be for forming a crosslinking agent-derived crosslinking part by a crosslinking reaction, for the carboxylic acid-modified nitrile-based copolymer.

The crosslinking agent composition may include one or more selected from the group consisting of a vulcanizing agent, a vulcanization accelerator, and metal oxides.

The vulcanizing agent is for vulcanizing the latex composition for dip molding and may be sulfur, and as a specific example, may be sulfur such as sulfur powder, precipitated sulfur, colloidal sulfur, surface-treated sulfur, and insoluble sulfur. The content of the vulcanizing agent may be 0.3 part by weight to 3 parts by weight, based on 100 parts by weight of the total content of the carboxylic acid-modified nitrile-based copolymer in the latex composition for dip molding, and within the range, crosslinking ability by vulcanization is excellent.

In addition, the vulcanizing accelerator may be one or more selected from the group consisting of 2-mercaptobenzothiazole (MBT), 2,2-dithiobisbenzothiazole-2-sulfenamide (MBTS), N-cyclohexylbenzothiazole-2-sulfenamide (CBS), 2-morpholinothiobenzothiazole (MBS), tetramethylthiuram monosulfide (TMTM), tetramethylthiuram disulfide (TMTD), zinc diethyldithiocarbamate (ZDEC), zinc di-n-butyldithiocarbamate (ZDBC), diphenylguanidine (DPG), and di-o-tolylguanidine. The content of the vulcanization accelerator may be 0.3 parts by weight to 3 parts by weight, based on 100 parts by weight of the total content of the carboxylic acid-modified nitrile-based copolymer in the latex composition for dip molding, and within the range, crosslinking ability by vulcanization is excellent.

In addition, the metal oxide may include zinc oxide, magnesium oxide, aluminum oxide, and the like, and may be a crosslinking agent for forming a crosslinking agent-derived crosslinking part by an ionic bonding in the carboxylic acid-modified nitrile-based copolymer or between the carboxylic acid-modified nitrile-based copolymers, by performing ionic bonding to a functional group of the ethylenic unsaturated acid monomer of the carboxylic acid-modified nitrile-based copolymer in the latex composition for dip molding. The content of the metal oxide may be 0.3 part by weight to 3 parts by weight, based on 100 parts by weight of the total content of the carboxylic acid-modified nitrile-based copolymer in the latex composition for dip molding, and within the range, the ion bonding ability is excellent and the tensile strength of the manufactured dip-molded article is excellent.

In addition, according to an exemplary embodiment of the present invention, the latex composition for dip molding may further include an additive such as a dispersing agent, an antioxidant, a pigment, a filler, a thickener, and a pH adjusting agent, if necessary.

According to an exemplary embodiment of the present invention, the latex composition for dip molding may have, as an example, a solid content (concentration) of 5 wt % to 43 wt %, and within the range, latex transport efficiency is excellent and an increase in latex viscosity is prevented to have excellent storage stability.

As another example, the latex composition for dip molding may be pH 9 to 11, and within the range, processability and productivity during manufacture of the dip-molded article are excellent. The pH of the latex composition for dip molding may be adjusted by adding the pH adjusting agent described above. The pH adjusting agent may be, as an example, an aqueous potassium hydroxide solution having a concentration of 1 wt % to 10 wt %, or ammonia water having a concentration of 1 wt % to 50 wt %.

According to the present invention, a molded article including a layer derived from the latex composition for dip molding is provided. The molded article may be a dip-molded article manufactured by dip-molding the latex composition for dip molding.

A method of manufacturing a molded article for molding the molded article may include immersion in the latex composition for dip molding by a direct dipping method, an anode coagulation dipping method, a Teague coagulation dipping method, or the like, and as a specific example, may be performed by the anode coagulation dipping method, and in this case, a dip-molded article having a uniform thickness may be obtained.

As a specific example, the method of manufacturing a molded article may include attaching a coagulant to a dip mold (S100); immersing the dip mold to which the coagulant is attached in the latex composition for dip molding to form a latex composition for a dip molding-derived layer, that is, a dip molding layer (S200); and heating the dip molding layer to crosslink the latex composition for dip molding (S300).

(S100) is a step of soaking the dip mold in a coagulant solution for forming the coagulant on the dip mold to attach the coagulant to the surface of the dip mold, and the coagulant solution is a solution in which a coagulant is dissolved in water, alcohol, or a mixture thereof and the content of the coagulant in the coagulant solution may be 5 wt % to 45 wt %, based on the total content of the coagulant solution.

The coagulant may be, as an example, one or more selected from the group consisting of metal halides such as barium chloride, calcium chloride, magnesium chloride, zinc chloride, and aluminum chloride; nitrates such as barium nitrate, calcium nitrate, and zinc nitrate; acetates such as barium acetate, calcium acetate, and zinc acetate; and sulfates such as calcium sulfate, magnesium sulfate, and aluminum sulfate, and as a specific example, may be calcium chloride or calcium nitrate.

In addition, (S200) may be a step of immersing the dip mold to which the coagulant is attached in the latex composition for dip molding according to the present invention for forming the dip molding layer, and taking out the mold and forming the dip molding layer on the dip mold.

In addition, (S300) may be step of heating the dip molding layer formed on the dip mold for obtaining the dip molded article to crosslink the latex composition for dip molding to proceed with the curing.

Thereafter, the dip molding layer which is crosslinked by a heating treatment may be stripped from the dip mold to obtain the dip-molded article.

The molded article may be gloves such as surgical gloves, examination gloves, industrial gloves, and household gloves, condoms, catheters, or health care products.

Hereinafter, the present invention will be described in more detail by the Examples. However, the following Examples are provided for illustrating the present invention. It is apparent to a person skilled in the art that various modifications and alterations may be made without departing from the scope and spirit of the present invention, and the scope of the present invention is not limited thereto.

EXAMPLES

Example 1

<Preparation of Carboxylic Acid-Modified Nitrile-Based Copolymer Latex>

Hereinafter, wt % is based on the total content of the monomer introduced for forming a main chain of the carboxylic acid-modified nitrile-based copolymer, and % by weight is based on 100 parts by weight of the total monomers introduced.

To a polymerization reactor with a stirrer installed, 23 wt % of acrylonitrile and 3.5 wt % of methacrylic acid were introduced and then stirring was started to mix them, 0.6 parts by weight of t-dodecylmercaptan, 4.0 parts by weight of sodium dodecylbenzene sulfonate, and 120 parts by weight of water at 70° C. were introduced thereto, then 73.5 wt % of 1,3-butadiene was introduced, and 0.3 parts by weight of potassium persulfate which is a polymerization initiator was introduced at a temperature of 40° C. under a pressure of 2.5 kgf/cm$^2$ to initiate emulsion polymerization.

When a polymerization conversion rate was 40%, a reaction pressure was controlled to 2.68 kgf/cm$^2$, when a polymerization conversion rate was 60%, a reaction pressure was controlled to 3.55 kgf/cm$^2$, and when a polymerization conversion rate was 90%, a reaction pressure was controlled to 1.25 kgf/cm$^2$.

When a polymerization conversion rate reached 94%, polymerization was stopped. Thereafter, unreacted substances were removed by a deodorization process, and ammonia water, an antioxidant, and a defoamer were added to obtain a carboxylic acid-modified nitrile-based copolymer latex.

<Preparation of Latex Composition for Dip Molding>

To 100 parts by weight (based on solid content) of the thus-obtained carboxylic acid-modified nitrile-based copolymer latex, 1 part by weight of sulfur, 1.0 part by weight of zinc di-n-butyldithiocarbamate (ZDBC), 1.3 parts by weight of zinc oxide, 1 part by weight of titanium oxide, a potassium hydroxide solution, and secondary distilled water were added, thereby obtaining a latex composition for dip molding at pH 10.2 having a solid content concentration of 30 wt %.

<Manufacture of Molded Article>

18 wt % of calcium nitrate, 81.5 wt % of water, and 0.5 wt % of a wetting agent (manufactured by Huntsman Corporation, Teric 320) were mixed to prepare a coagulant solution, and a hand-shaped ceramic mold was soaked in this solution for 13 seconds, taken out, and dried at 120° C. for minutes, thereby applying the coagulant on the hand-shaped mold.

Subsequently, the hand-shaped mold to which the coagulant was applied was soaked in the latex composition for dip molding obtained above for 13 seconds, taken out, dried at 80° C. for 1 minute, and then soaked in water or warm water for 60 seconds. Then, crosslinking was performed at 120° C. for 20 minutes. The crosslinked dip-molded layer was stripped from the hand-shaped mold to obtain a glove shaped molded article.

Example 2

To a polymerization reactor with a stirrer installed, 18 wt % of acrylonitrile and 4.5 wt % of methacrylic acid were introduced and then stirring was started to mix them, 0.3 parts by weight of t-dodecylmercaptan, 3.0 parts by weight of sodium dodecylbenzene sulfonate, and 130 parts by weight of water at 70° C. were introduced thereto, then 77.5 wt % of 1,3-butadiene was introduced, and 0.25 parts by weight of potassium persulfate which is a polymerization initiator was introduced at a temperature of 40° C. under a pressure of 2.7 kgf/cm$^2$ to initiate emulsion polymerization.

When a polymerization conversion rate was 40%, a reaction pressure was controlled to 2.89 kgf/cm$^2$, when a polymerization conversion rate was 60%, a reaction pressure was controlled to 3.83 kgf/cm$^2$, and when a polymerization conversion rate was 90%, a reaction pressure was controlled to 1.35 kgf/cm$^2$.

When a polymerization conversion rate reached 96%, polymerization was stopped. Thereafter, unreacted substances were removed by a deodorization process, and ammonia water, an antioxidant, and a defoamer were added to obtain a carboxylic acid-modified nitrile-based copolymer latex.

The thus-obtained carboxylic acid-modified nitrile-based copolymer latex was used to prepare a latex composition for dip molding and manufacture a molded article in the manner as in Example 1.

Example 3

To a polymerization reactor with a stirrer installed, wt % of acrylonitrile and 2.5 wt % of methacrylic acid were introduced and then stirring was started to mix them, 0.8 parts by weight of t-dodecylmercaptan, 3.0 parts by weight of sodium dodecylbenzene sulfonate, and 110 parts by weight of water at 50° C. were introduced thereto, then 69.5 wt % of 1,3-butadiene was introduced, and 0.35 parts by weight of potassium persulfate which is a polymerization initiator was introduced at a temperature of 37° C. under a pressure of 2.2 kgf/cm$^2$ to initiate emulsion polymerization.

When a polymerization conversion rate was 40%, a reaction pressure was controlled to 2.35 kgf/cm$^2$, when a polymerization conversion rate was 60%, a reaction pressure was controlled to 3.12 kgf/cm$^2$, and when a polymerization conversion rate was 90%, a reaction pressure was controlled to 1.10 kgf/cm$^2$.

When a polymerization conversion rate reached 94%, polymerization was stopped. Thereafter, unreacted substances were removed by a deodorization process, and ammonia water, an antioxidant, and a defoamer were added to obtain a carboxylic acid-modified nitrile-based copolymer latex.

The thus-obtained carboxylic acid-modified nitrile-based copolymer latex was used to prepare a latex composition for dip molding and manufacture a molded article in the manner as in Example 1.

Example 4

To a polymerization reactor with a stirrer installed, 25 wt % of acrylonitrile and 4.1 wt % of methacrylic acid were introduced and then stirring was started to mix them, 0.3 parts by weight of t-dodecylmercaptan, 2.5 parts by weight of sodium dodecylbenzene sulfonate, and 140 parts by weight of water at 55° C. were introduced thereto, then 70.9 wt % of 1,3-butadiene was introduced, and 0.2 parts by weight of potassium persulfate which is a polymerization initiator was introduced at a temperature of 40° C. under a pressure of 2.4 kgf/cm$^2$ to initiate emulsion polymerization.

When a polymerization conversion rate was 40%, a reaction pressure was controlled to 2.57 kgf/cm$^2$, when a polymerization conversion rate was 60%, a reaction pressure was controlled to 3.41 kgf/cm$^2$, and when a polymerization conversion rate was 90%, a reaction pressure was controlled to 1.20 kgf/cm$^2$.

When a polymerization conversion rate reached 96%, polymerization was stopped. Thereafter, unreacted substances were removed by a deodorization process, and ammonia water, an antioxidant, and a defoamer were added to obtain a carboxylic acid-modified nitrile-based copolymer latex.

The thus-obtained carboxylic acid-modified nitrile-based copolymer latex was used to prepare a latex composition for dip molding and manufacture a molded article in the manner as in Example 1.

Example 5

To a polymerization reactor with a stirrer installed, wt % of acrylonitrile and 2.9 wt % of methacrylic acid were introduced and then stirring was started to mix them, 0.6 parts by weight of t-dodecylmercaptan, 3.5 parts by weight of sodium dodecylbenzene sulfonate, and 110 parts by weight of water at 75° C. were introduced thereto, then 76.1 wt % of 1,3-butadiene was introduced, and 0.3 parts by weight of potassium persulfate which is a polymerization initiator was introduced at a temperature of 39° C. under a pressure of 2.6 kgf/cm$^2$ to initiate emulsion polymerization.

When a polymerization conversion rate was 40%, a reaction pressure was controlled to 2.78 kgf/cm$^2$, when a polymerization conversion rate was 60%, a reaction pressure was controlled to 3.69 kgf/cm$^2$, and when a polymerization conversion rate was 90%, a reaction pressure was controlled to 1.30 kgf/cm$^2$.

When a polymerization conversion rate reached 95%, polymerization was stopped. Thereafter, unreacted substances were removed by a deodorization process, and ammonia water, an antioxidant, and a defoamer were added to obtain a carboxylic acid-modified nitrile-based copolymer latex.

The thus-obtained carboxylic acid-modified nitrile-based copolymer latex was used to prepare a latex composition for dip molding and manufacture a molded article in the manner as in Example 1.

Example 6

To a polymerization reactor with a stirrer installed, wt % of acrylonitrile and 4.5 wt % of methacrylic acid were introduced and then stirring was started to mix them, 0.25 parts by weight of t-dodecylmercaptan, 3.0 parts by weight of sodium dodecylbenzene sulfonate, and 110 parts by weight of water at 60° C. were introduced thereto, then 67.5 wt % of 1,3-butadiene was introduced, and 0.45 parts by weight of potassium persulfate which is a polymerization initiator was introduced at a temperature of 36° C. under a pressure of 2.0 kgf/cm$^2$ to initiate emulsion polymerization.

When a polymerization conversion rate was 40%, a reaction pressure was controlled to 2.14 kgf/cm$^2$, when a polymerization conversion rate was 60%, a reaction pressure was controlled to 2.84 kgf/cm$^2$, and when a polymerization conversion rate was 90%, a reaction pressure was controlled to 1.00 kgf/cm$^2$.

When a polymerization conversion rate reached 97%, polymerization was stopped. Thereafter, unreacted substances were removed by a deodorization process, and ammonia water, an antioxidant, and a defoamer were added to obtain a carboxylic acid-modified nitrile-based copolymer latex.

The thus-obtained carboxylic acid-modified nitrile-based copolymer latex was used to prepare a latex composition for dip molding and manufacture a molded article in the manner as in Example 1.

Example 7

To a polymerization reactor with a stirrer installed, wt % of acrylonitrile and 2.5 wt % of methacrylic acid were introduced and then stirring was started to mix them, 0.5 parts by weight of t-dodecylmercaptan, 3.5 parts by weight of sodium dodecylbenzene sulfonate, and 120 parts by weight of water at 65° C. were introduced thereto, then 79.5 wt % of 1,3-butadiene was introduced, and 0.15 parts by weight of potassium persulfate which is a polymerization initiator was introduced at a temperature of 41° C. under a pressure of 2.8 kgf/cm$^2$ to initiate emulsion polymerization.

When a polymerization conversion rate was 40%, a reaction pressure was controlled to 3.00 kgf/cm$^2$, when a polymerization conversion rate was 60%, a reaction pressure was controlled to 3.98 kgf/cm$^2$, and when a polymerization conversion rate was 90%, a reaction pressure was controlled to 1.40 kgf/cm$^2$.

When a polymerization conversion rate reached 94%, polymerization was stopped. Thereafter, unreacted substances were removed by a deodorization process, and ammonia water, an antioxidant, and a defoamer were added to obtain a carboxylic acid-modified nitrile-based copolymer latex.

The thus-obtained carboxylic acid-modified nitrile-based copolymer latex was used to prepare a latex composition for dip molding and manufacture a molded article in the manner as in Example 1.

Example 8

To a polymerization reactor with a stirrer installed, 26 wt % of acrylonitrile and 4 wt % of methacrylic acid were introduced and then stirring was started to mix them, 0.6 parts by weight of t-dodecylmercaptan, 3.5 parts by weight of sodium dodecylbenzene sulfonate, and 120 parts by weight of water at 60° C. were introduced thereto, then 70 wt % of isoprene was introduced, and 0.3 parts by weight of potassium persulfate which is a polymerization initiator was introduced at a temperature of 41° C. under a pressure of 2.4 kgf/cm$^2$ to initiate emulsion polymerization.

When a polymerization conversion rate was 40%, a reaction pressure was controlled to 2.57 kgf/cm$^2$, when a polymerization conversion rate was 60%, a reaction pressure was controlled to 3.41 kgf/cm$^2$, and when a polymerization conversion rate was 90%, a reaction pressure was controlled to 1.20 kgf/cm$^2$.

When a polymerization conversion rate reached 94%, polymerization was stopped. Thereafter, unreacted substances were removed by a deodorization process, and ammonia water, an antioxidant, and a defoamer were added to obtain a carboxylic acid-modified nitrile-based copolymer latex.

The thus-obtained carboxylic acid-modified nitrile-based copolymer latex was used to prepare a latex composition for dip molding and manufacture a molded article in the manner as in Example 1.

COMPARATIVE EXAMPLE

Comparative Example 1

To a polymerization reactor with a stirrer installed, 31 wt % of acrylonitrile and 6 wt % of methacrylic acid were introduced, 0.6 parts by weight of t-dodecylmercaptan, 4.0 parts by weight of sodium dodecylbenzene sulfonate, and 120 parts by weight of water at 60° C. were introduced thereto, then 63 wt % of 1,3-butadiene was introduced, 0.3 parts by weight of potassium persulfate which is a polymerization initiator was introduced at a temperature of 39° C. under a pressure of 2.5 kgf/cm$^2$, and emulsion polymerization was initiated while stirring was started.

When a polymerization conversion rate was 40%, a reaction pressure was controlled to 2.68 kgf/cm$^2$, when a polymerization conversion rate was 60%, a reaction pressure was controlled to 3.55 kgf/cm$^2$, and when a polymerization conversion rate was 90%, a reaction pressure was controlled to 1.25 kgf/cm$^2$.

When a polymerization conversion rate reached 94%, polymerization was stopped. Thereafter, unreacted substances were removed by a deodorization process, and ammonia water, an antioxidant, and a defoamer were added to obtain a carboxylic acid-modified nitrile-based copolymer latex.

The thus-obtained carboxylic acid-modified nitrile-based copolymer latex was used to prepare a latex composition for dip molding and manufacture a molded article in the manner as in Example 1.

Comparative Example 2

To a polymerization reactor with a stirrer installed, 0.25 parts by weight of t-dodecylmercaptan, 3.0 parts by weight of sodium dodecylbenzene sulfonate, and 110 parts by weight of water at 60° C. were introduced and then stirring was started to mix them, 28 wt % of acrylonitrile, 4.5 wt % of methacrylic acid, and 67.5 wt % of 1,3-butadiene were introduced, and 0.45 parts by weight of potassium persulfate which is a polymerization initiator was introduced at a temperature of 36° C. under a pressure of 2.0 kgf/cm$^2$ to initiate emulsion polymerization.

When a polymerization conversion rate was 40%, a reaction pressure was controlled to 2.14 kgf/cm$^2$, when a polymerization conversion rate was 60%, a reaction pressure was controlled to 2.84 kgf/cm$^2$, and when a polymerization conversion rate was 90%, a reaction pressure was controlled to 1.00 kgf/cm$^2$.

When a polymerization conversion rate reached 97%, polymerization was stopped. Thereafter, unreacted substances were removed by a deodorization process, and ammonia water, an antioxidant, and a defoamer were added to obtain a carboxylic acid-modified nitrile-based copolymer latex.

The thus-obtained carboxylic acid-modified nitrile-based copolymer latex was used to prepare a latex composition for dip molding and manufacture a molded article in the manner as in Example 1.

Comparative Example 3

To a polymerization reactor with a stirrer installed, 18 wt % of acrylonitrile and 1 wt % of methacrylic acid were introduced, 0.25 parts by weight of t-dodecylmercaptan, 4.0 parts by weight of sodium dodecylbenzene sulfonate, and 110 parts by weight of water at 70° C. were introduced thereto, then 81 wt % of 1,3-butadiene was introduced, 0.45 parts by weight of potassium persulfate which is a polymerization initiator was introduced at a temperature of 40° C. under a pressure of 2.8 kgf/cm$^2$, and emulsion polymerization was initiated while stirring was started.

When a polymerization conversion rate was 40%, a reaction pressure was controlled to 3.00 kgf/cm$^2$, when a polymerization conversion rate was 60%, a reaction pressure was controlled to 3.98 kgf/cm$^2$, and when a polymerization conversion rate was 90%, a reaction pressure was controlled to 1.40 kgf/cm$^2$.

When a polymerization conversion rate reached 97%, polymerization was stopped. Thereafter, unreacted substances were removed by a deodorization process, and ammonia water, an antioxidant, and a defoamer were added to obtain a carboxylic acid-modified nitrile-based copolymer latex.

The thus-obtained carboxylic acid-modified nitrile-based copolymer latex was used to prepare a latex composition for dip molding and manufacture a molded article in the manner as in Example 1.

Comparative Example 4

To a polymerization reactor with a stirrer installed, wt % of acrylonitrile and 2.5 wt % of methacrylic acid were introduced, 0.6 parts by weight of t-dodecylmercaptan, 4.0 parts by weight of sodium dodecylbenzene sulfonate, and 120 parts by weight of water at 50° C. were introduced thereto, then 66.5 wt % of 1,3-butadiene was introduced, 0.3 parts by weight of potassium persulfate which is a polymerization initiator was introduced at a temperature of 37° C. under a pressure of 2.2 kgf/cm², and emulsion polymerization was initiated while stirring was started.

When a polymerization conversion rate was 40%, a reaction pressure was controlled to 2.35 kgf/cm², when a polymerization conversion rate was 60%, a reaction pressure was controlled to 3.12 kgf/cm², and when a polymerization conversion rate was 90%, a reaction pressure was controlled to 1.10 kgf/cm².

When a polymerization conversion rate reached 94%, polymerization was stopped. Thereafter, unreacted substances were removed by a deodorization process, and ammonia water, an antioxidant, and a defoamer were added to obtain a carboxylic acid-modified nitrile-based copolymer latex.

The thus-obtained carboxylic acid-modified nitrile-based copolymer latex was used to prepare a latex composition for dip molding and manufacture a molded article in the manner as in Example 1.

Comparative Example 5

To a polymerization reactor with a stirrer installed, 0.25 parts by weight of t-dodecylmercaptan, 4 parts by weight of sodium dodecylbenzene sulfonate, and 130 parts by weight of water at 65° C. were introduced, 14 wt % of acrylonitrile, 6 wt % of methacrylic acid, and 80 wt % of 1,3-butadiene were introduced and then stirring was started to mix them, and 0.45 parts by weight of potassium persulfate which is a polymerization initiator was introduced at a temperature of 41° C. under a pressure of 2.4 kgf/cm² to initiate emulsion polymerization.

When a polymerization conversion rate was 40%, a reaction pressure was controlled to 2.57 kgf/cm², when a polymerization conversion rate was 60%, a reaction pressure was controlled to 3.41 kgf/cm², and when a polymerization conversion rate was 90%, a reaction pressure was controlled to 1.20 kgf/cm².

When a polymerization conversion rate reached 97%, polymerization was stopped. Thereafter, unreacted substances were removed by a deodorization process, and ammonia water, an antioxidant, and a defoamer were added to obtain a carboxylic acid-modified nitrile-based copolymer latex.

The thus-obtained carboxylic acid-modified nitrile-based copolymer latex was used to prepare a latex composition for dip molding and manufacture a molded article in the manner as in Example 1.

Experimental Examples

Experimental Example 1

The physical properties of the carboxylic acid-modified nitrile-based copolymer latex prepared in the Examples and the Comparative Examples were measured as described later, and are shown in the following Table 1.

(1) $CV_0$ (mm²/s): the pH of each carboxylic acid-modified nitrile-based copolymer latex having a solid content of 44% to 47% was adjusted to 8.8 to 9.1 using 10% ammonia water, and the latex was dissolved in methyl ethyl ketone (MEK) at a concentration of 2.55 wt % and dispersed well. Then, 10 ml of the solution was added to a capillary viscometer of a Cannon-Fenske routine type (SI Analytics GmbH Type No. 520 13), a time for the solution to pass a capillary tube at 25° C. was measured, and the viscosity was calculated using the following Equation 2:

$$CV_0 = K \times t \quad \text{[Equation 2]}$$

wherein K is a constant (mm²/s²) of the capillary tube, and t is a time (s) to pass the capillary tube.

(2) $CV_D$ (mm²/s), P: The pH of each carboxylic acid-modified nitrile-based copolymer latex having a solid content of 44% to 47% was adjusted to 8.8 to 9.1 using 10% ammonia water, and the latex was dissolved in methyl ethyl ketone (MEK) at a concentration of 2.55 wt % and dispersed well. Then, an energy of 55 kcal to 65 kcal was applied for 40 minutes using an ultrasonicator (Bransonic® M Mechanical Bath 5800) to deswell the latex, 10 ml of the solution was added to a capillary viscometer of a Cannon-Fenske routine type (SI Analytics GmbH Type No. 520 13), a time for the solution to pass a capillary tube at 25° C. was measured, and the viscosity ($CV_D$) was calculated using Equation 2: The thus-obtained $CV_D$ was divided by $CV_0$ to measure P. ($P = CV_D/CV_0$)

(3) M: The pH of each carboxylic acid-modified nitrile-based copolymer latex having a solid content of 44% to 47% was adjusted to 8.8 to 9.1 using 10% ammonia water, applied on a substrate by a cast method or the like, dried at 130° C. to 140° C. for 40 minutes to obtain a dried film, and the weight ($f_1$) of the dried film was measured. Subsequently, the dried film was immersed in methyl ethyl ketone at 25° C. for 48 hours, the weight ($f_2$) of the film after immersion was measured, and the film was dried at 170° C. for 30 minutes to remove methyl ethyl ketone. Then, the weight ($f_3$) of the film after removal of methyl ethyl ketone was measured, an insolubility ($m_1$) and a swelling index ($m_2$) in the methyl ethyl ketone solvent were measured according to the following Equation 3 and General Formula 4 from the measurement results of the weight thereof, and M was measured according to Equation 5.

$$\text{Insolubility in methyl ethyl ketone solvent}(m_1) = f_3/f_1 \quad \text{[Equation 3]}$$

$$\text{Swelling index in methyl ethyl ketone solvent}(m_2) = (f_2 - f_3)/f_3 \quad \text{[Equation 4]}$$

$$M = m_1 \times m_2 \quad \text{[Equation 5]}$$

(4) pKa: The carboxylic acid-modified nitrile-based copolymer latex according to Example 1 was diluted to a solid content of 10% using deionized water, the pH thereof was increased using a 1.25% aqueous potassium hydroxide solution, and stirring was performed at 50° C. for 2 hours to remove ammonia in the aqueous solution. The obtained diluted solution was cooled down to room temperature, the pH was decreased to 2 or less using an aqueous hydrochloric acid solution diluted to 1%, and stirring was performed at a temperature of 50° C. for 2 hours. Then, the diluted solution obtained by removing carbon dioxide in the aqueous solution was cooled down to room temperature, and a 3% aqueous potassium hydroxide solution having an exact concentration was used to obtain an acid base titration graph. The results are shown in the following FIGS. 1 and 2. FIG. 1 is a graph showing a pH change depending on the amount of KOH introduced, and the amount of carboxylic acid calculated by the amount of KOH introduced between a first inflection point and a second inflection point in FIG. 1 is the amount of acid present on the surface. FIG. 2 is a differential equation of the amount of KOH introduced depending on pH, and a point corresponding to a vertex of the quadratic function is pKa of the carboxylic acid-modified nitrile-based copolymer latex. In addition, pKa of the carboxylic acid-modified nitrile-based copolymer latexes according to the remaining Examples and Comparative Examples was confirmed in the same manner.

TABLE 1

|  | $CV_O$ (mm²/s) | $CV_D$ (mm²/s) | P | M | pKa |
|---|---|---|---|---|---|
| Example 1 | 2.13 | 1.96 | 0.92 | 10.7 | 9.93 |
| Example 2 | 1.26 | 1.17 | 0.93 | 13.9 | 9.61 |
| Example 3 | 2.81 | 2.59 | 0.92 | 7.6 | 10.14 |
| Example 4 | 2.57 | 2.36 | 0.92 | 11.3 | 9.85 |
| Example 5 | 1.65 | 1.52 | 0.92 | 11.2 | 9.80 |
| Example 6 | 3.00 | 2.76 | 0.92 | 12.7 | 9.73 |
| Example 7 | 1.00 | 0.93 | 0.93 | 9.3 | 9.97 |
| Example 8 | 2.68 | 2.47 | 0.92 | 11.7 | 9.80 |
| Comparative Example 1 | 5.3 | 4.88 | 0.92 | 19.7 | 9.28 |
| Comparative Example 2 | 4.06 | 3.74 | 0.92 | 12.7 | 9.73 |
| Comparative Example 3 | 0.48 | 0.45 | 0.93 | 6.9 | 10.36 |
| Comparative Example 4 | 4.03 | 3.71 | 0.92 | 7.6 | 10.14 |
| Comparative Example 5 | 0.4 | 0.37 | 0.92 | 19.9 | 9.22 |

Referring to Table 1, in Examples 1 to 8, it was confirmed that for the carboxylic acid-modified nitrile-based copolymer latex according to the present invention, the process factors as well as the monomer composition of the copolymer were controlled, thereby adjusting the molecular weight of the carboxylic acid-modified nitrile-based copolymer, the carboxyl group distribution of the copolymer in the latex particles, and the like in the polymerization process to optimize the structure of the latex particles, so that the physical properties of the latex itself were improved, and also, $CV_O$ satisfied 1.0 to 3.0.

However, in Comparative Examples 1 to 5, since the structures of the latex particles were not optimized like the present invention, it was difficult to improve the physical properties of the latex.

Experimental Example 2

The physical properties of the molded article manufactured in the Examples and the Comparative Examples were measured in the following manner, and are shown in the following Table 2.

(1) Elongation (%): a dumbbell-shaped specimen was manufactured from the molded article in accordance with a method of ASTM D-412, the specimen was pulled at a crosshead speed of 500 mm/min using a measuring instrument U.T.M (Instron, 3345 model), a point where the specimen was cut was measured, and the elongation was calculated according to the following Equation 6:

Elongation (%)=(length after specimen elongation/initial length of specimen)×100  [Equation 6]

(2) Modulus at 500% (Mpa): a dumbbell-shaped specimen was manufactured from the molded article in accordance with a method of ASTM D-412, the specimen was pulled at a crosshead speed of 500 mm/min using a measuring instrument U.T.M (Instron, 3345 model), and then a stress when the elongation was 500% was measured.

TABLE 2

|  | Elongation (%) | modulus at 500% (MPa) |
|---|---|---|
| Example 1 | 615 | 16.1 |
| Example 2 | 641 | 12.3 |
| Example 3 | 604 | 17.3 |
| Example 4 | 609 | 17.2 |
| Example 5 | 632 | 13.3 |
| Example 6 | 601 | 18.1 |
| Example 7 | 650 | 10.2 |
| Example 8 | 606 | 17.1 |
| Comparative Example 1 | 480 | — |
| Comparative Example 2 | 502 | 34.6 |
| Comparative Example 3 | 530 | 29.5 |
| Comparative Example 4 | 504 | 34.7 |
| Comparative Example 5 | 521 | 29.2 |

Referring to Table 2, in Examples 1 to 8, the molded article molded from the latex composition for dip molding including the carboxylic acid-modified nitrile-based copolymer latex according to the present invention had a high elongation and a low modulus value at 500%, and thus, it was confirmed that both elongation and softness were improved.

However, in Comparative Examples 1 to 5, it was confirmed that the molded article molded from the latex composition for dip molding including the carboxylic acid-modified nitrile-based copolymer latex which was not improved like the present invention had significantly deteriorated elongation and modulus value at 500% as compared with the Examples.

In addition, in Comparative Example 1, for the molded article molded from the latex composition for dip molding including the carboxylic acid-modified nitrile-based copolymer latex which was not improved like the present invention, the elongation was measured as being less than 500%, and the modulus value at 500% was not measurable.

The invention claimed is:

1. A carboxylic acid-modified nitrile-based copolymer latex comprising a carboxylic acid-modified nitrile-based copolymer including: 65.5 wt % to 82.5 wt % of a conjugated diene-based monomer-derived unit, 15 wt % to 30 wt % of an ethylenic unsaturated nitrile-based monomer-derived unit, and 2.5 wt % to 4.5 wt % of an ethylenic unsaturated acid monomer-derived unit, wherein the carboxylic acid-modified nitrile-based copolymer latex satisfies the following Formula 1:

$$1.0 \text{ mm}^2/\text{s} \leq CV_O \leq 3.0 \text{ mm}^2/\text{s} \quad \text{[Formula 1]}$$

wherein $CV_O$ represents a capillary viscosity of the carboxylic acid-modified nitrile-based copolymer latex which is measured in a swollen state in a methyl ethyl ketone solvent.

2. The carboxylic acid-modified nitrile-based copolymer latex of claim 1, wherein the carboxylic acid-modified nitrile-based copolymer includes 18 wt % to 28 wt % of the ethylenic unsaturated nitrile-based monomer-derived unit.

3. The carboxylic acid-modified nitrile-based copolymer latex of claim 1, wherein the carboxylic acid-modified nitrile-based copolymer includes 67.5 wt % to 79.5 wt % of the conjugated diene-based monomer-derived unit.

4. The carboxylic acid-modified nitrile-based copolymer latex of claim 1, wherein the conjugated diene-based monomer includes one or more selected from the group consisting of 1,3-butadiene, 2,3-dimethyl-1,3-butadiene, 2-ethyl-1,3-butadiene, 1,3-pentadiene, and isoprene.

5. The carboxylic acid-modified nitrile-based copolymer latex of claim 1, wherein the ethylenic unsaturated nitrile-based monomer includes one or more selected from the group consisting of acrylonitrile, methacrylonitrile, fumaronitrile, a-chloronitrile, and a-cyanoethyl acrylonitrile.

6. The carboxylic acid-modified nitrile-based copolymer latex of claim 1, wherein the ethylenic unsaturated acid monomer includes one or more selected from the group consisting of acrylic acid, methacrylic acid, itaconic acid, maleic acid, fumaric acid, anhydrous maleic acid, anhydrous citraconic acid, styrene sulfonic acid, monobutyl fumarate, monobutyl maleate, and mono-2-hydroxypropyl maleate.

7. The carboxylic acid-modified nitrile-based copolymer latex of claim 1, wherein the conjugated diene-based monomer is 1,3-butadiene or isoprene, the ethylenic unsaturated nitrile-based monomer is acrylonitrile, and the ethylenic unsaturated acid monomer is methacrylic acid.

8. The carboxylic acid-modified nitrile-based copolymer latex of claim 1, wherein the carboxylic acid-modified nitrile-based copolymer further includes an ethylenic unsaturated monomer-derived unit.

9. The carboxylic acid-modified nitrile-based copolymer latex of claim 1, wherein the carboxylic acid-modified nitrile-based copolymer latex satisfies the following Formula 2:

$$0.85 \leq P \leq 1.0, P = CV_D/CV_0 \quad \text{[Formula 2]}$$

wherein $CV_0$ represents a capillary viscosity of the carboxylic acid-modified nitrile-based copolymer latex which is measured in a swollen state in the methyl ethyl ketone solvent, and $CV_D$ represents a capillary viscosity of the carboxylic acid-modified nitrile-based copolymer latex in a deswollen state.

10. The carboxylic acid-modified nitrile-based copolymer latex of claim 1, wherein the carboxylic acid-modified nitrile-based copolymer latex satisfies the following Formulas 3 and 4:

$$5 \leq M \leq 20, M = m_1 \times m_2 \quad \text{[Formula 3]}$$

$$9.2 \leq pKa \leq 10.5 \quad \text{[Formula 4]}$$

wherein $m_1$ represents an insolubility of a dried film of the carboxylic acid-modified nitrile-based copolymer latex in the methyl ethyl ketone solvent, $m_2$ represents a swelling index of the dried film of the carboxylic acid-modified nitrile-based copolymer latex in the methyl ethyl ketone solvent, and pKa is an ionization degree of an ethylenic unsaturated acid of the carboxylic acid-modified nitrile-based copolymer latex.

* * * * *